United States Patent
Warner

[19]

[11] Patent Number: 6,142,274
[45] Date of Patent: Nov. 7, 2000

[54] POWER TAKE-OFF UNIT WITH SELECTIVELY ENGAGED BRAKE

[75] Inventor: Russell K. Warner, Toledo, Ohio

[73] Assignee: Dana Corporation, Toledo, Ohio

[21] Appl. No.: 08/774,399

[22] Filed: Dec. 30, 1996

[51] Int. Cl.$^7$ ............................................. F16D 67/04
[52] U.S. Cl. ...................... 192/18 A; 192/12 C; 74/15.86
[58] Field of Search ................................ 192/18 A, 12 C, 192/15; 74/15.86

[56] References Cited

U.S. PATENT DOCUMENTS

| | | | |
|---|---|---|---|
| 2,402,052 | 6/1946 | Johansen | 192/18 A |
| 3,224,538 | 12/1965 | Ward | 192/18 A |
| 3,441,114 | 4/1969 | Pensa | 192/18 A X |
| 3,507,372 | 4/1970 | Gilbertson et al. | 192/18 A X |
| 3,669,229 | 6/1972 | Ronayne et al. | |
| 3,698,524 | 10/1972 | Schubert | 192/18 A |
| 3,770,085 | 11/1973 | Cottingham | 192/18 A X |
| 3,805,931 | 4/1974 | Portmann | 192/18 A |
| 3,872,954 | 3/1975 | Nordstrom et al. | |
| 4,066,157 | 1/1978 | Gibbs | 192/18 A X |
| 4,275,607 | 6/1981 | Snoy | 192/18 A X |
| 4,399,715 | 8/1983 | Dziuba et al. | 192/18 A X |
| 4,613,024 | 9/1986 | Irikura et al. | 192/18 A |
| 5,415,257 | 5/1995 | Shimamura et al. | |
| 5,437,355 | 8/1995 | Takagi et al. | 192/18 A |
| 5,542,306 | 8/1996 | Fernandez | 192/18 A X |
| 5,573,092 | 11/1996 | Gabilondo | 192/18 A |
| 5,806,641 | 9/1998 | Sommer | 192/18 A |
| 5,873,444 | 2/1999 | Kozhevnikov et al. | 192/18 A |
| 5,921,361 | 7/1999 | Sommer | 192/18 A |

FOREIGN PATENT DOCUMENTS 2261488 5/1993 United Kingdom.

*Primary Examiner*—Charles A. Marmor
*Assistant Examiner*—Ha Ho
*Attorney, Agent, or Firm*—MacMillan, Sobanski & Todd, LLC

[57] ABSTRACT

A power take-off unit includes a hydraulically actuated brake assembly which is automatically engaged when a hydraulically actuated clutch assembly is disengaged, and further which is automatically disengaged when the clutch assembly is engaged. The power take-off unit includes a housing which contains an input gear and an output shaft. The input gear is adapted to be connected to an engine or transmission of a vehicle or other source of rotational power so as to be rotatably driven in a conventional manner. The output shaft is adapted to be connected to rotatably driven accessory, such as a hydraulic pump. The power take-off unit includes a clutch assembly for selectively providing a driving connection between the input gear and the output shaft and a brake assembly for selectively exerting a braking force to retard rotation of the output shaft. When pressurized fluid is provided from a source to a clutch chamber, the clutch assembly is engaged to cause the output shaft to be rotatably driven by the input gear. Simultaneously, the pressurized fluid is fed to a brake chamber to disengage the brake assembly and permit free rotation of the output shaft. When pressurized fluid is not provided from the source to the clutch chamber, the clutch assembly is disengaged to prevent the output shaft from being rotatably driven by the input gear. At the same time, the lack of pressurized fluid in the brake chamber to engages the brake assembly and exert the braking force to retard rotation of the output shaft.

11 Claims, 4 Drawing Sheets

POWER TAKE-OFF UNIT WITH SELECTIVELY ENGAGED BRAKE

BACKGROUND OF THE INVENTION

This invention relates in general to a power take-off unit including a hydraulically actuated clutch assembly for selectively driving an accessory from a source of rotational power, such as a vehicle engine or transmission. More specifically, this invention relates to an improved structure for a power take-off unit including a hydraulically actuated brake assembly which is automatically engaged when the clutch assembly is disengaged, and further which is automatically disengaged when the clutch assembly is engaged.

Power take-off units are well known mechanical devices which are commonly used in conjunction with sources of rotational power, such as vehicle engines and transmissions, for rotatably driving a driven accessory. For example, power take-off units are commonly used in a variety of industrial and agricultural vehicles for operating hydraulic pumps which, in turn, operate hydraulically driven devices, such as plows, trash compactors, lifting mechanisms, winches, and the like. A typical power take-off unit includes a housing which rotatably supports an input gear (which is rotatably driven by the vehicle engine), an output shaft (which is connected to the driven device), and a set of meshing intermediate gears. The meshing intermediate gears are connected in a gear train between input gear and the output shaft so as to provide a rotatable driving connection between the engine of the vehicle and the driven accessory. The set of gears permits one or more speed reduction gear ratios to be provided between the input gear and the output shaft.

In many instances, the power take-off unit further includes a clutch assembly for selectively disconnecting the output shaft from the input gear. The use of a clutch assembly in a power take-off unit is desirable because it permits selective or intermittent operation of the driven accessory without having to turn off the vehicle engine. When the clutch assembly is engaged, the output shaft is rotatably driven by the input gear. Consequently, the driven device is operated by the vehicle engine. Conversely, when the clutch assembly is disengaged, the output shaft is not rotatably driven by the input gear. As a result, the driven device is not operated by the vehicle engine.

During operation, the meshing of the various gears contained within the housing of the power take-off unit can generate significant amounts of undesirable friction and heat. To minimize the adverse effects of this friction and heat, it is common to provide a quantity of lubricating fluid within the housing of the power take-off unit. When the input gear of the power take-off unit is connected to a vehicle transmission, for example, the lubricating fluid may be the transmission lubricating fluid. The teeth of the various gears contained within the housing of the power take-off unit are moved through the lubricating fluid during operation to minimize the adverse effects of friction and heat.

As mentioned above, when the clutch assembly is disengaged, the output shaft is not rotatably driven by the input gear, and the driven device is not operated by the vehicle engine. In this disengaged condition, the output shaft is simply disconnected from the input gear and is allowed to free-wheel within the housing of the power take-off unit. Under most conditions, the combination of being disconnected from the source of rotational power with the inherent resistance to further movement imposed by the load of the driven device causes the output shaft to immediately cease further rotation until the clutch assembly is subsequently re-engaged. Unfortunately, it has been found that under certain circumstances, the relatively viscous nature of the lubricating fluid can cause the output shaft to continue to be at least partially rotatably driven, even though the clutch assembly has been disengaged. This undesirable rotation of the output shaft after disengagement of the clutch assembly can, for example, occur when the temperature of the lubricating fluid is relatively cold and viscous, such as when the vehicle is initially started. Obviously, rotation of the output shaft of the power take-off unit (and, thus, operation of the driven device) after the clutch assembly has been disengaged is undesirable.

To address this, it is known to provide a power take-off unit with a brake assembly to slow or stop rotation of the output shaft. In one known power take-off unit, an internal drag brake constantly applies a braking force to the output shaft to retard rotation thereof, regardless of whether the clutch assembly of the power take-off unit clutch is engaged for operation or disengaged for non-operation. This constantly-braked power take-off structure is undesirable because it requires frequent adjustments to insure that the proper amount of braking force is applied to the output shaft. This is because the various components of the brake assembly will wear during use, thus varying the amount of the braking force. Also, wear and heat occur rapidly and frequently within the power take-off unit, resulting in frequent maintenance and repair. Furthermore, the magnitude of the braking force which can be exerted is limited so as to not adversely affect the operation of the power take-off unit when the clutch assembly is engaged for normal use.

In another known power take-off unit, a braking member is mechanically is actuated by the clutch assembly of the power take-off unit. In this mechanically actuated power take-off structure, a clutch piston of the clutch assembly is urged toward a disengaged position by a spring. To engage the clutch assembly, hydraulic fluid is applied to move the clutch piston against the urging of the spring to an engaged position. The braking member is connected to the clutch piston through a mechanical linkage. Thus, when the clutch piston is in the disengaged position, the braking member is in the engaged position. Conversely, when the clutch piston is in the engaged position, the braking member is in the disengaged position. This mechanically actuated brake assembly structure has been found to be undesirable because the brake assembly cannot be operated independent of the clutch assembly. Rather, operation of the brake assembly is totally reliant on the successful operation of the clutch assembly. Thus, it would be desirable to provide an improved structure for a power take-off unit including an internal brake assembly which avoids the drawbacks of these known structures.

SUMMARY OF THE INVENTION

This invention relates to an improved structure for a power take-off unit which includes a hydraulically actuated brake assembly which is automatically engaged when a hydraulically actuated clutch assembly is disengaged, and further which is automatically disengaged when the clutch assembly is engaged. The power take-off unit includes a housing which contains an input gear and an output shaft. The input gear is adapted to be connected to an engine or transmission of a vehicle or other source of rotational power so as to be rotatably driven in a conventional manner. The output shaft is adapted to be connected to rotatably driven accessory, such as a hydraulic pump. The power take-off unit includes a clutch assembly for selectively providing a driving connection between the input gear and the output shaft and a brake assembly for selectively exerting a braking force to retard rotation of the output shaft. When pressurized fluid is provided from a source to a clutch chamber, the clutch assembly is engaged to cause the output shaft to be rotatably driven by the input gear. Simultaneously, the pressurized fluid is fed to a brake chamber to disengage the brake assembly and permit free rotation of the output shaft. When pressurized fluid is not provided from the source to the clutch chamber, the clutch assembly is disengaged to prevent the output shaft from being rotatably driven by the input gear. At the same time, the lack of pressurized fluid in the brake chamber to engages the brake assembly and exert the braking force to retard rotation of the output shaft.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
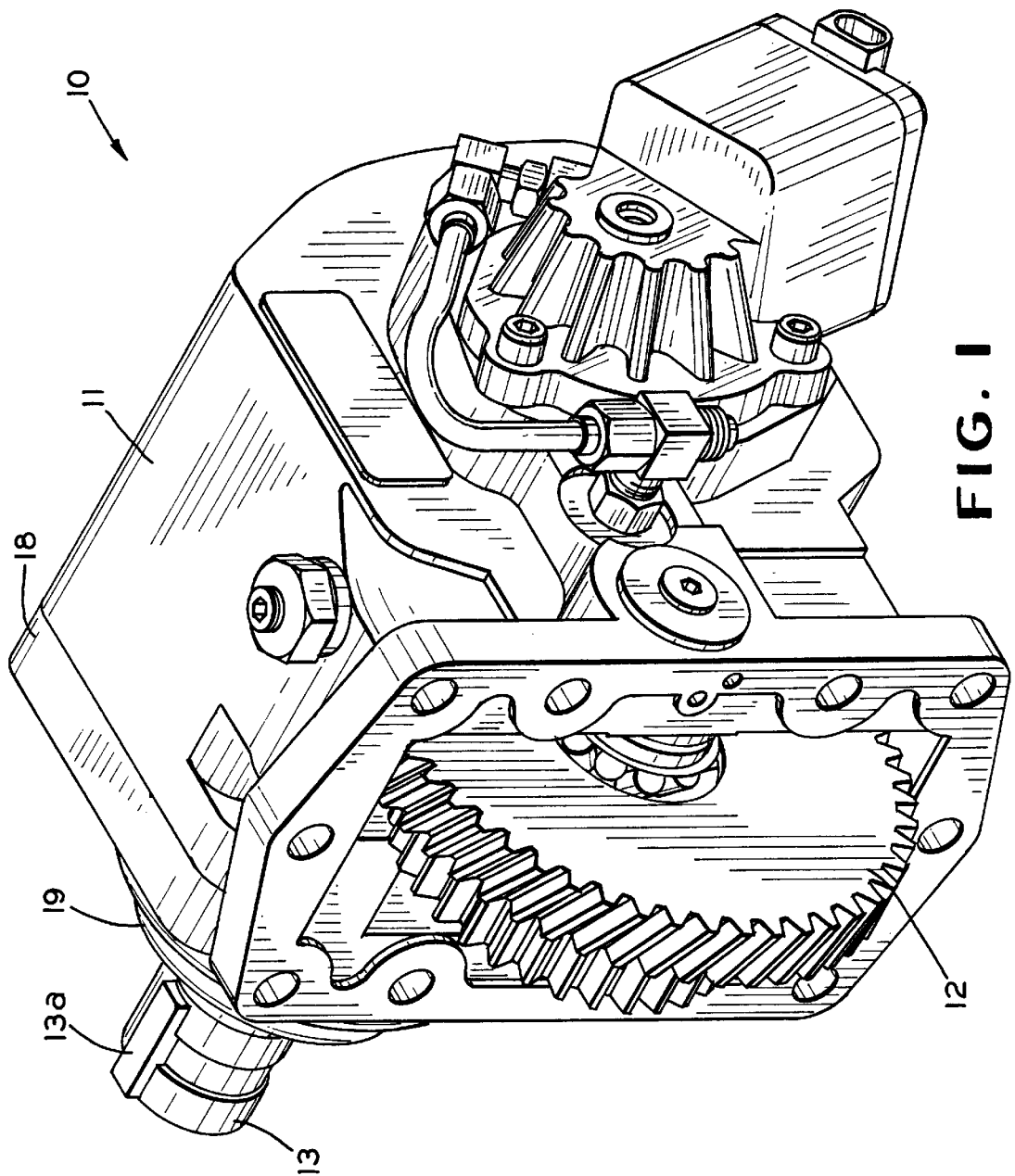
FIG. 1 is a perspective view of a power take-off unit in accordance with this invention.

Referring now to the drawings, there is illustrated in FIG. 1 a power take-off unit, indicated generally at 10, in accordance with this invention. The basic structure and mode of operation of the power take-off unit 10 are well known in the art, and only those portions of the power take-off unit 10 which are necessary for a complete understanding of the invention will be described. The power take-off unit 10 includes a rigid housing 11 which contains an input gear 12 and an output shaft 13. The input gear 12 is adapted to be connected to an engine or transmission (not shown) of a vehicle or other source of rotational power so as to be rotatably driven in a conventional manner. The output shaft 13 is adapted to be connected to rotatably driven accessory (not shown), such as a hydraulic pump. The illustrated output shaft 13 is cylindrical in shape and is provided with a conventional key 13a for facilitating a rotatable driving connection with the driven accessory.

Figure 2:
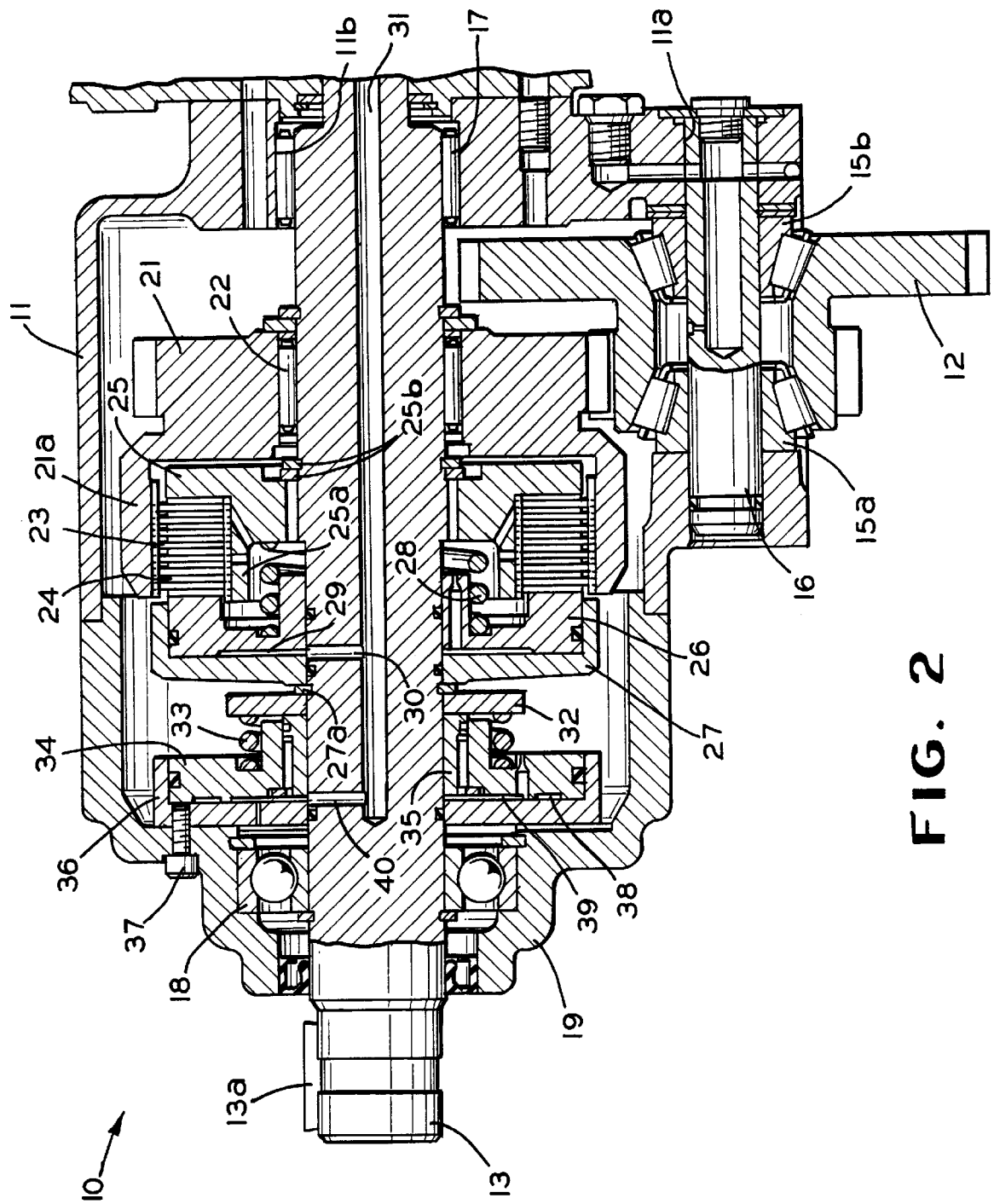
FIG. 2 is a sectional elevational view of the power take-off unit illustrated in FIG. 1, wherein the clutch assembly is disengaged and the brake assembly is engaged.

Referring now to FIG. 2, the input gear 12 is supported by a pair of tapered roller bearings 15a and 15b for rotation on a non-rotatable idler shaft 16 contained within the housing 11 of the power take-off unit 10. The ends of the idler shaft 16 are supported within respective openings 11a formed through the housing 11 of the power take-off unit 10. One end of the output shaft 13 (the right end when viewing FIG. 2) is rotatably supported by conventional needle bearings 17 provided within an opening 11b formed through the housing 11 of the power take-off unit 10. The other end of the output shaft 13 (the left end when viewing FIG. 2) is rotatably supported by a conventional annular bearing 18 mounted within a bearing cap 19 secured about an open end of the housing 11 of the power take-off unit 10.

The power take-off unit 10 includes a clutch assembly for selectively providing a driving connection between the input gear 12 and the output shaft 13. The clutch assembly includes a drive gear 21 which meshes with the input gear 12. The drive gear 21 is rotatably supported on the output shaft 13 by a plurality of conventional needle bearings 22. The drive gear 21 includes an axially-extending hollow cylindrical portion 21a having a splined inner surface. A plurality of flat annular clutch plates 23 is splined to the inner splined surface of the hollow cylindrical portion 21a of the drive gear 21 for rotation therewith. Thus, the drive gear 21 and the clutch plates 23 are constantly rotatably driven by the input gear 12.

A plurality of annular friction plates 24 is disposed in alternating fashion between the clutch plates 23. The friction plates 24 are splined to an outer splined surface provided on an axially extending cylindrical portion 25a of a clutch gear 25 for rotation therewith. The clutch gear 25 is splined or otherwise secured to the output shaft 13 for rotation therewith. Thus, the friction plates 24, the clutch gear 25, and the output shaft 13 are connected for rotation together as a unit. The clutch gear 25 is restrained from axial movement in one direction (toward the right when viewing FIG. 2) by one or more retaining rings 25b which are mounted on the output shaft 13, for a purpose which will be explained below.

The clutch plates 23 and the friction plates 24 form a portion of a clutch assembly for the power take-off unit 10. An annular clutch piston 26 is provided for selectively causing the clutch plates 23 and the friction plates 24 to frictionally engage one another so as to engage the clutch assembly. To accomplish this, the clutch piston 26 is disposed within a hollow cylindrical clutch cylinder 27. The clutch cylinder 27 has a closed end and an opened end. One end of the clutch piston 26 (the left end when viewing FIG. 2) is disposed within the clutch cylinder 27, while the opposite end of the clutch piston 26 (the right end when viewing FIG. 2) extends from the opened end of the clutch cylinder 27 adjacent to the clutch plates 23 and friction plates 24. Both the clutch piston 26 and the clutch cylinder 27 are supported on the output shaft 13. The clutch piston 26 is axially movable along the output shaft 13, but the clutch cylinder 27 is restrained from axial movement in one direction (toward the left when viewing FIG. 2) by one or more retaining rings 27a which are mounted on the output shaft 13, for a purpose which will be explained below.

A coiled clutch spring 28 reacts between the clutch piston 26 and the clutch gear 25. As discussed above, the clutch gear 25 is restrained from axial movement in one direction (toward the right when viewing FIG. 2) by the retaining rings 25b. Thus, the clutch spring 28 urges the clutch piston 26 axially in the opposite direction (toward the left when viewing FIG. 2) toward a disengaged position adjacent to the closed end of the clutch cylinder 27. In the disengaged position, the clutch piston 26 does not engage the clutch plates 23 and the friction plates 24. Thus, the clutch plates 23 and the friction plates 24 do not frictionally engage one another. As a result, the clutch gear 25 is disconnected from the drive gear 21 so as to provide no rotatable driving connection therebetween.

An annular clutch chamber 29 is defined between the clutch piston 26 and the closed end of the clutch cylinder 27. This annular clutch chamber 29 communicates through a first transverse passageway 30 and an axial passageway 31 formed through the output shaft with a source of pressurized fluid (not shown). As will be explained in greater detail below, when pressurized fluid is provided from the source to the annular clutch chamber 29, the clutch piston 26 is moved axially against the urging of the clutch spring 28 from the disengaged position to an engaged position. In the engaged position, the clutch piston 26 compresses the clutch plates 23 and the friction plates 24 together so as to provide a rotatable driving connection therebetween. As a result, the clutch gear 25 is connected to the drive gear 21, and the output shaft 13 is rotatably driven by the input gear 12.

The power take-off unit 10 further includes a brake assembly for selectively retarding rotation of the output shaft 13. The brake assembly includes a backup plate 32 which is mounted on the output shaft 13. The brake backup plate 32 is restrained from axial movement in one direction (toward the right when viewing FIG. 2) by the retaining ring 27a. A coiled brake spring 33 reacts between the backup plate 32 and a first end of a brake piston 34. The brake piston 34 is splined on a brake hub 35 for rotation therewith, and the brake hub 35 is splined or otherwise secured to the output shaft 13 for rotation therewith. Thus, the brake hub 35, the brake piston 34, and the output shaft 13 are connected for rotation together as a unit. The brake piston 34 is axially movable along the brake hub 35 in both directions.

The brake piston 34 has a second end which is disposed within a hollow cylindrical brake cylinder 36. The brake cylinder 36 is disposed about the output shaft 13 and has a closed end and an opened end. The brake cylinder 36 is secured to the bearing cap 19 by one or more threaded fasteners 37 or by any other suitable means. Thus, the brake cylinder 36 is fixed in position and does not rotate with the brake hub 35, the brake piston 34, and the output shaft 13. The second end of the brake piston 34 has a friction pad 38 secured thereto. The friction pad 38 may, alternatively, be secured to the brake cylinder 36. In either event, an annular brake chamber 39 is defined between the brake piston 34 and the closed end of the brake cylinder 36. The annular brake chamber 39 communicates through a second transverse passageway 40 formed in the output shaft 13 and the axial passageway 31 with the source of pressurized fluid.

As mentioned above, the backup plate 32 is restrained from axial movement in one direction (toward the right when viewing FIG. 2). Thus, the brake spring 33 urges the brake piston 34 axially in the opposite direction (toward the left when viewing FIG. 2) away from the backup plate 32 and toward an engaged position, wherein the brake piston 34 frictionally engages the closed end of the brake cylinder 36. Inasmuch as the brake hub 35 and the output shaft 13 are connected to the brake piston 34 for rotation therewith, it will be appreciated that a braking force is applied to the output shaft 13 when the brake piston 34 is in the engaged position. As a result, rotation of the output shaft 13 is retarded. When pressurized fluid is provided from the source to the annular brake chamber 39, the brake piston 34 is moved axially against the urging of the brake spring 33 from the engaged position to a disengaged position. In the disengaged position, the brake piston 34 does not engage the closed end of the brake cylinder, thereby allowing the brake piston 34, the brake hub 35, and the output shaft 13 to rotate freely.

Figure 3:
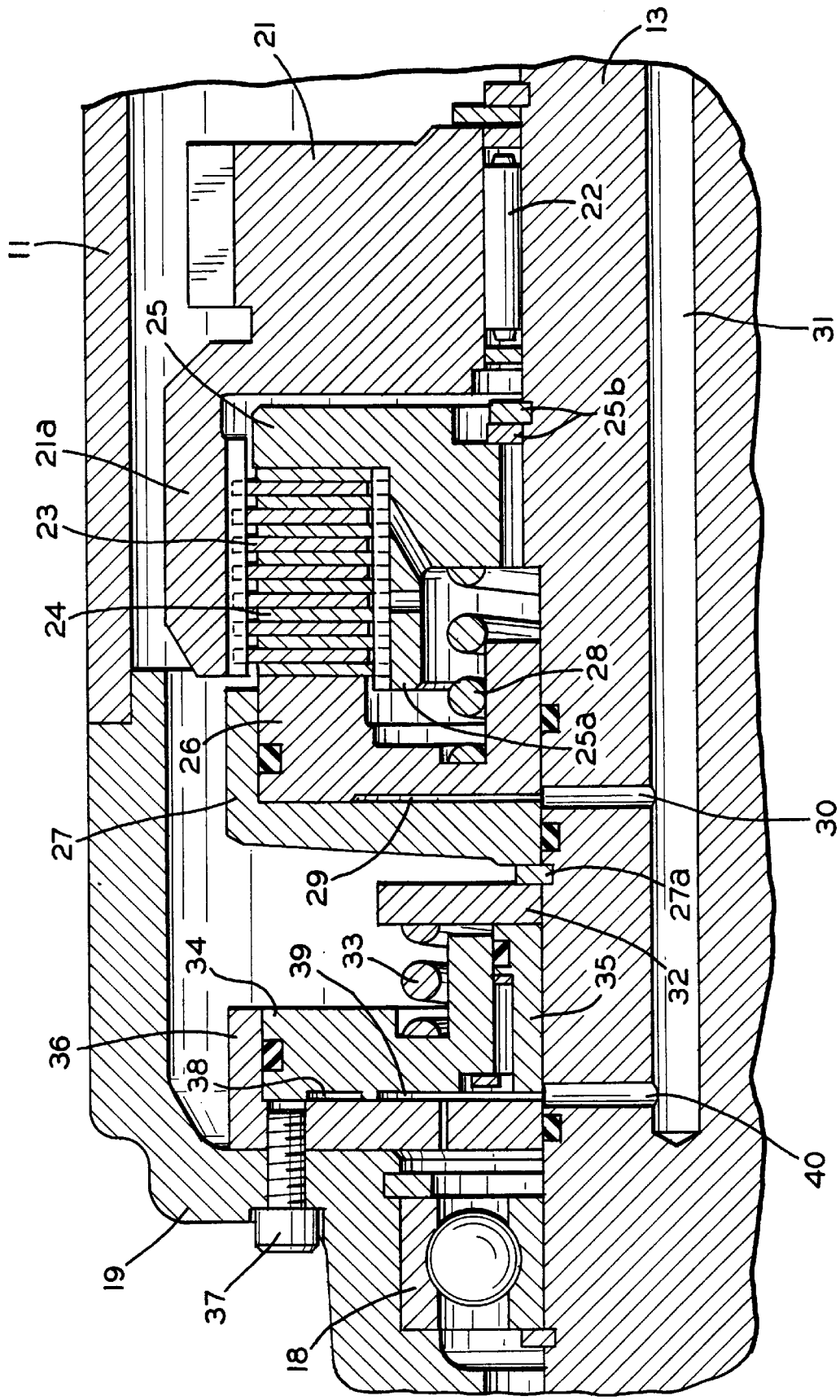
FIG. 3 is an enlarged sectional elevational view of a portion of the power take-off unit illustrated in FIG. 2.

The overall operation of the power take-off unit 10 will now be described. When the engine of the vehicle is started, the input gear 12 is driven to rotate. Rotation of the input gear 12 causes rotation of the drive gear 21 to freely rotate around the output shaft 13. Assuming that the source of pressurized fluid has not been turned on, there is no pressurized fluid in any of the passageways 30, 31, and 40. Therefore, the clutch assembly is maintained in its normally disengaged position under the influence of the clutch spring 28. As mentioned above, the clutch spring 28 moves the clutch piston 26 within the clutch cylinder 27 (toward the left when viewing FIG. 2) and away from the clutch plates 23 and friction plates 24. Thus, the clutch plates 23 and 24 do not frictionally engage one another, and the output shaft 13 is not rotatably driven by the input gear 12. At the same time, the brake assembly is maintained in its normally engaged position under the influence of the brake spring 33. As mentioned above, the brake spring 33 moves the brake piston 34 into frictional engagement with the brake cylinder 36 (toward the left when viewing FIG. 2). Thus, it will be appreciated that the clutch assembly is disengaged while the brake assembly is simultaneously engaged. As a result, the output shaft 13 is affirmatively prevented from rotating. An enlarged view of the relevant portions of the power take-off assembly 10 in this condition is shown in FIG. 3.

Figure 4:
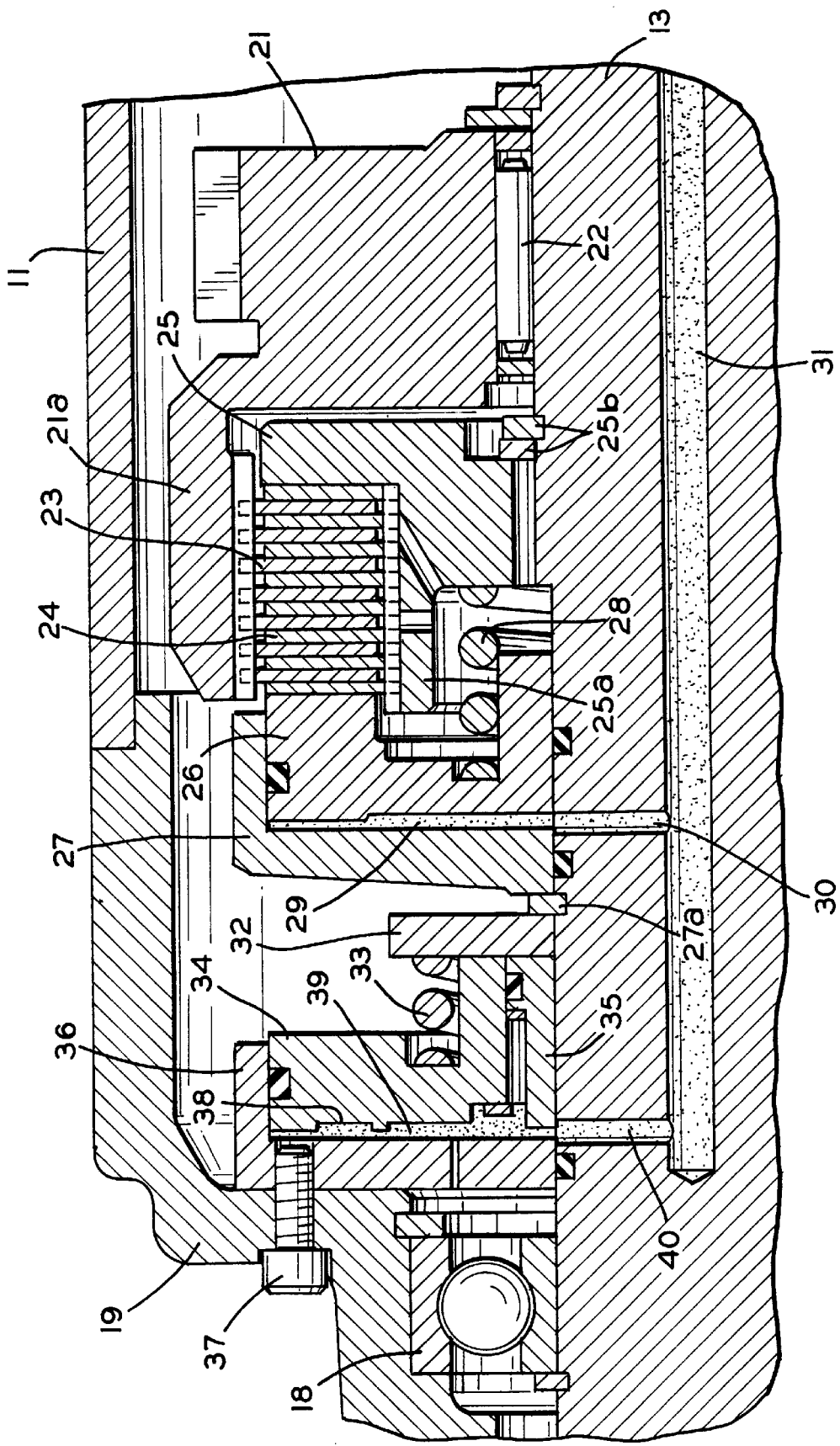
FIG. 4 is an enlarged sectional elevational view similar to FIG. 3, wherein the clutch assembly is engaged and the brake assembly is disengaged.

When it is desired to engage the power take-off unit 10 to operate a driven device, the source of pressurized fluid is actuated to supply pressurized fluid in the passageways 30, 31, and 41. When this occurs, the fluid pressure within the annular clutch chamber 29 overcomes the force exerted by the clutch spring 28 and moves the clutch piston 26 axially into engagement with the friction plates 24 and clutch plates 23. Thus, the clutch piston 26 functions as a hydraulic actuator for the clutch assembly. As a result of this frictional engagement, the clutch gear 25 and the output shaft 13 are caused to rotate with the drive gear 21. Simultaneously, the fluid pressure within the annular brake chamber 39 overcomes the force exerted by the brake spring 33 and moves the brake piston 34 axially out of frictional engagement with the brake cylinder 36. Thus, the brake piston 33 functions as a hydraulic actuator for the brake assembly. As a result, the brake piston 34, the brake hub 35, and the output shaft 13 are free to be rotatably driven by the input gear 12. An enlarged view of the relevant portions of the power take-off assembly 10 in this condition is shown in FIG. 4.

Because the first transverse passageway 31 (which operates the clutch assembly) and the second transverse passageway 40 (which operates the brake assembly) both function as conduits which communicate directly with the axial passageway 31, it will be appreciated that both of the annular chambers 29 and 39 will be pressurized simultaneously. Assuming that the spring forces exerted by the clutch spring 28 and the brake spring 33 are approximately the same, the clutch assembly and the brake assembly will be simultaneously actuated. However, the spring forces exerted by the clutch spring 28 and the brake spring 33 need not be the same, and may alternatively be different to provide for sequential actuation of the clutch assembly and the brake assembly. Alternatively, the transverse passageways 30 and 40 may be differently sized pressurize the annular chambers 29 and 39 at different rates for sequential operation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power take-off unit adapted to be connected between an engine-driven vehicular transmission and a driven accessory, said power take-off unit comprising:

an input gear adapted to be connected to the transmission;

an output shaft adapted to be connected to the driven accessory;

a clutch assembly for selectively connecting said input gear to rotatably drive said outputd shaft, said clutch assembly including a clutch plate connected for rotation with said input gear, a friction plate connected for rotation with said output shaft, a clutch spring for normally maintaining said clutch plate and said friction plate in a disengaged relationship such that said input gear does not rotatably drive said output shaft, and a clutch piston that is responsive to fluid pressure for moving said clutch plate and said friction plate to an engaged relationship such that said input gear rotatably drives said output shaft; and a brake assembly for selectively retarding rotation of said output shaft, said brake assembly including a brake cyclinder that is restrained from rotation, a brake piston disposed within said brake cylinder and connected for rotation with said output shaft, and a brake spring for normally maintaining said brake cylinder and said brake piston in an engaged relationship such that said brake piston engages said brake cylinder to retard rotation of said output shaft, said brake piston being repsonsive to fluid pressure for moving said brake cylinder and said brake piston to a disengaged relationship such that said brake piston does nto engage said brake cylinder to retard rotation of said output shaft.

2. The power take-off unit defined in claim 1 further including a housing enclosing said input gear, said output shaft, said clutch assembly, and said brake assembly, said brake cylinder being connected to said housing so as to be restrained from rotation.

3. The power take-off unit defined in claim 1 wherein said clutch piston and said brake piston are responsive to fluid pressure for simultaneously moving said clutch plate and said friction plate to a disengaged relationship such that said input gear does not rotatably drive said output shaft and moving said brake cylinder and said brake piston to a disengaged relationship such that said brake piston does not engage said brake cylinder to retard rotation of said output shaft.

4. The power take-off unit defined in claim 1 wherein said clutch piston is supported on said output shaft.

5. The power take-off unit defined in claim 1 wherein said clutch assembly includes a clutch cylinder, said clutch piston being disposed in said clutch cylinder.

6. The power take-off unit defined in claim 5 wherein said clutch cylinder is supported on said output shaft.

7. The power take-off unit defined in claim 5 wherein a clutch chamber is defined between said clutch cylinder and said clutch piston, and further including a passageway formed through said output shaft that communicates with said clutch chamber.

8. The power take-off unit defined in claim 1 wherein a brake chamber is defined between said brake cylinder and said brake piston, and further including a passageway formed through said output shaft that communicates with said brake chamber.

9. The power take-off unit defined in claim 1 wherein said clutch assembly includes a clutch cylinder, said clutch piston being disposed in said clutch cylinder, and wherein a clutch chamber is defined between said clutch cylinder and said clutch piston, and a wherein brake chamber is defined between said brake cylider and said brake piston, and further including a passageway formed through said output shaft that communicates with said clutch chamber and said brake chamber.

10. The power take-off unit defined in claim 1 wherein said brake piston is supported on said output shaft.

11. The power take-off unit defined in claim 1 wherein said brake assembly includes a brake hub, said brake position being disposed on said brake hub.

* * * * *